(12) United States Patent
Höckner

(10) Patent No.: US 7,938,151 B2
(45) Date of Patent: May 10, 2011

(54) SAFETY DEVICE TO PREVENT OVERFILLING

(75) Inventor: Dagmar Höckner, Ebreichsdorf (AT)

(73) Assignee: Security & Electronic Technologies GmbH, Leobersdorf (AT)

( * ) Notice: Subject to any disclaimer, the term of this patent is extended or adjusted under 35 U.S.C. 154(b) by 784 days.

(21) Appl. No.: 11/632,543

(22) PCT Filed: Jul. 7, 2005

(86) PCT No.: PCT/EP2005/053128
§ 371 (c)(1),
(2), (4) Date: Dec. 5, 2007

(87) PCT Pub. No.: WO2006/005686
PCT Pub. Date: Jan. 19, 2006

(65) Prior Publication Data
US 2008/0223482 A1 Sep. 18, 2008

(30) Foreign Application Priority Data
Jul. 15, 2004 (AT) .................. A 1207/2004

(51) Int. Cl.
B65B 3/04 (2006.01)

(52) U.S. Cl. ............ 141/95; 141/18; 141/198; 141/237; 141/243

(58) Field of Classification Search .......... 141/18, 141/95, 98, 198, 237, 242, 243
See application file for complete search history.

(56) References Cited

U.S. PATENT DOCUMENTS

| 3,807,433 | A * | 4/1974 | Byrd | 141/290 |
|---|---|---|---|---|
| 4,313,228 | A * | 1/1982 | Berstein | 398/131 |
| 5,507,326 | A * | 4/1996 | Cadman et al. | 141/95 |
| 5,534,856 | A * | 7/1996 | Cadman | 340/5.31 |
| 5,785,100 | A * | 7/1998 | Showalter et al. | 141/198 |
| 6,224,353 | B1 | 5/2001 | Iseman | 417/326 |
| 6,931,305 | B2 * | 8/2005 | Sherwood | 700/282 |
| 7,536,264 | B2 * | 5/2009 | Hillam et al. | 702/55 |
| 7,546,256 | B2 * | 6/2009 | Hillam et al. | 705/28 |
| 7,574,385 | B2 * | 8/2009 | Hillam et al. | 705/28 |
| 7,689,371 | B2 * | 3/2010 | Memmott et al. | 702/55 |
| 7,783,435 | B2 * | 8/2010 | Hillam et al. | 702/55 |
| 2005/0268971 | A1 * | 12/2005 | Nasalroad et al. | 137/565.13 |
| 2006/0157149 | A1 * | 7/2006 | Hillam et al. | 141/198 |

FOREIGN PATENT DOCUMENTS

| DE | 20016410 | 3/2001 |
|---|---|---|
| EP | 0668240 | 8/1995 |

* cited by examiner

Primary Examiner — Gregory L Huson
Assistant Examiner — Nicolas A Arnett
(74) Attorney, Agent, or Firm — Andrew Wilford

(57) ABSTRACT

The invention relates to a device for preventing overfilling of a plurality of fuel tanks (8) at a gasoline station, in the event that fuel tanks are filled simultaneously by multi-chamber tank vehicles (7). The fuel tanks (8) are equipped with filling level threshold indicators (3) linked to a transmitter (1) for wireless transmission of a signal. A receiver (2) mounted in the tank vehicle (7) is provided to control one or several tank valves. In order to ensure safe closure of the tank valves, the filling level threshold indicators (3) of the fuel tanks (8) at the gasoline station are connected each to a signal line (5) leading to a common interface (4). Only one transmitter (1) along with an interrogation control device is provided for connecting to said interface (4) and cooperates with the receiver (2) mounted in the tank vehicle (7). The receiver is connected to a control for receiving address-coded signals from the transmitter (1), said control being connected to an actuating device for selectively disconnecting the tank valves of the tank vehicle (7).

3 Claims, 1 Drawing Sheet

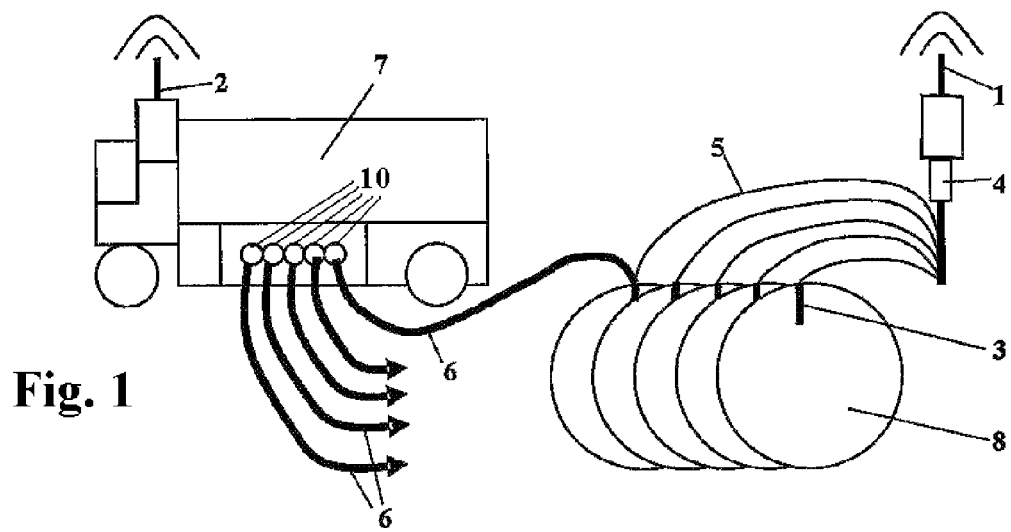
Fig. 1
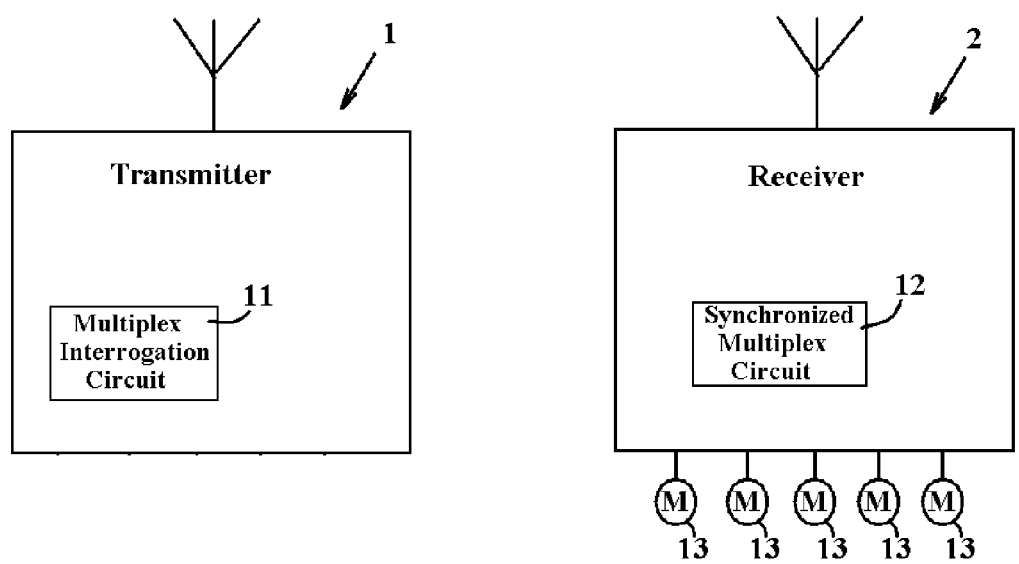
Fig. 2  Fig. 3

SAFETY DEVICE TO PREVENT OVERFILLING

CROSS REFERENCE TO RELATED APPLICATIONS

This application is the US national phase of PCT application PCT/EP2005/053128, filed 7 Jul. 2005, published 19 Jan. 2006 as WO 2006/005686, and claiming the priority of Austrian patent application A1207/2004 itself filed 15 Jul. 2004.

FIELD OF THE INVENTION

The invention relates to a system for preventing overfilling of a plurality of fuel tanks at a filling station, that in particular are simultaneously filled from a multicompartment tank truck, the fuel tanks having fill-level threshold sensors, for example optical or thermistor sensors, that are connected to a transmitter for wireless transmission of a signal when a threshold value is reached, a receiver being provided on the tank truck for controlling a tank valve.

BACKGROUND OF THE INVENTION

A tank truck is known from DE 20016410 U that has multiple compartments, each of which is provided with a valve used for filling and draining the respective compartment. One fill-level sensor is provided in each of the compartments, and the fill-level sensors are connected to a computer that calculates the quantities filled into and dispensed from the individual compartments. This computer is connected via a wireless transmission link to a control unit having display and input elements for monitoring and controlling the filling and draining of the tanks at a filling station, and by means of which the necessary operations such as actuation of the valves may be monitored.

However, this approach has the disadvantage that the fill level can be monitored only in an indirect manner. The possibility of avoiding overfilling depends on the interaction between the fill-level indicator and the computer, for which the algorithms corresponding to the particular compartments or tanks must be entered into the computer memory. Since the compartments or tanks of a tank truck usually do not have simple shapes that can be easily calculated, inaccuracies usually occur as a result.

During filling of tanks at filling stations, there is always the problem that overfilling of the tanks, usually underground, must be avoided for environmental reasons. For this purpose optical or thermistor threshold sensors are provided that must be observed to prevent excess fuel from entering the tanks at the filling station. However, this involves uncertainty.

OBJECT OF THE INVENTION

The object of the invention is to avoid these disadvantages and provide a device of the above-described type in which overfilling may be reliably avoided during filling of tanks at a filling station and that also can make substantial use of the capacity of the tanks.

SUMMARY OF THE INVENTION

This object is achieved according to the invention by use of a system of the above-described type wherein each fill-level threshold sensor for the fuel tanks at the filling station is connected to a signal line that leads to a common interface in the form of a plug-in connector, and only one transmitter together with an interrogation circuit, for example a multiplex circuit, is provided for connection to the plug-in connector, the transmitter cooperating with a common receiver provided on the tank truck and connected to a synchronized multiplex circuit or a circuit for receiving address-coded signals from the transmitter, the circuit being connected to an actuating device for selectively shutting off the tank valves at the tank truck.

The proposed measures may be used to easily transmit information about reaching a predetermined fill level and to initiate automatic closing of the appropriate inlet valves. Each tank truck may have a permanently installed receiver and may also carry the transmitter. This transmitter may be easily attached to the interface, specifically, a plug-in connector, and may be removed when the filling process is completed. By use of the interrogation circuit, reaching the particular specified maximum fill level for each tank at the filling station may be determined.

Since the transmitter can always be transported in a given tank trunk, this transmitter may be precisely tuned to the transmission frequency of the receiver, making it unnecessary to adjust a particular transmission frequency on a receiver.

When according to the invention the transmitter and the receiver are each designed as measuring transducers for delivery, receipt, and conformity testing of identification codes there is the advantage that identification codes may be checked in a simple manner.

According to the invention, the transmitter, when connected to the plug-in connector and upon receipt of a ready signal from each threshold sensor transmits selective switching-on signals to the receivers on the tank truck for selectively releasing the opening of individual valves in the compartments of the tank truck. As a result the tanks at a filling station may be filled practically automatically. For this purpose it is sufficient to establish the appropriate hose connections and mount the transmitter on the interface. After the transmitter is activated the corresponding valves may be opened and the filling process started. When the maximum specified fill level is reached, transmission of a signal, generated by the fill-level threshold sensor, to the receiver causes the corresponding valve to close.

BRIEF DESCRIPTION OF THE DRAWINGS

The invention is explained in greater detail with reference to the drawing in which:

FIG. 1 schematically shows a system according to the invention; and

FIGS. 2 and 3 are schematic detail views respectively showing the transmitter and receiver of the system.

SPECIFIC DESCRIPTION

Multiple tanks, i.e. fuel tanks 8, are provided at a filling station, not illustrated in greater detail in FIG. 1. In each of these tanks 8 a fill-level threshold sensor 3 is provided that generates a signal when a predetermined level, preferably the maximum level, is reached in the respective tank 8.

These threshold sensors 3 may be known optical systems in which light is emitted, refracted in a defined manner on a glass prism on the probe, and reflected to a light-sensitive element. When the liquid reaches the prism the index of refraction is altered, and less light or no light at all is reflected to the light-sensitive element, whereupon a signal is outputted.

These fill-level threshold sensors 3 are connected via electrical lines 5 to an interface 4, which in the simplest case may be formed by a plug-in connector.

This interface 4 is attached to a portable transmitter 1 that preferably may be provided with an interrogation circuit such as a multiplexer 11, for example. It is practical to transport this transmitter 1 in a tank truck 7, in which a receiver 2 is installed that is able to communicate with the transmitter 1 and that has a synchronized multiplex circuit 12 and actuators 13 for tank valves 10.

During filling of the tanks 8], hoses 6 are extended from the valves 10 of the tank truck 7 to the tanks 8 and connected thereto.

After the transmitter 1 is activated, a wireless communication connection is established between the transmitter 1 and the receiver 2. It is advantageous to establish a radio link so that the transmitter 1 and the receiver 2, which preferably are designed as measuring transducers, are tuned and coded to one another. This prevents the possibility that another system within range of the transmitter 1 or the receiver 2 may influence the connection. The wireless protocol may be implemented digitally.

During communication between the transmitter 1, the receiver 2, and the interrogation circuit 11 associated with the transmitter 1, the individual fill-level threshold sensors 3 in the separate tanks 8 may be queried in rapid succession, and the information sent to the transmitter 1. To prevent transmitters 1 and/or receivers 2 of other systems from being inadvertently influenced, the communication between the transmitter 1 and the receiver 2 of one system is coded.

It is practical to connect the transmitter 1 to an evaluation circuit that shuts off a valve controlling the hose 6 connected to the tank 8 in question when a signal is received that indicates that the specified maximum fill level has been reached.

It is possible to shut off/close all the valves or only individual valves as the result of receiving signals corresponding to the maximum fill level.

The radio link between the transmitter 1 mounted on the interface 4 and the receiver 2 transported in the tank truck 7 may be set on a suitable frequency band, such as the short range device (SRD) band, formerly referred to as the low power device (LPD) band.

The invention claimed is:

1. In a system for preventing overfilling of a plurality of fuel tanks that are simultaneously filled from a multicompartment tank truck, the fuel tanks having respective fill-level threshold sensors, that are connected to a transmitter for wireless transmission of a signal when respective threshold values are reached, and a receiver being provided on the tank truck for controlling at least one tank valve, the improvement wherein
    each fill-level threshold sensor for the fuel tanks at the filling station is connected to a respective signal line that leads to a common interface in the form of a plug-in connector, and
    only one transmitter together with an interrogation circuit is provided for connection to the plug-in connector, and the transmitter cooperates with a common receiver provided on the tank truck, that is connected to a circuit for receiving address-coded signals from the transmitter, the circuit being connected to an actuating device for selectively shutting off the tank valves at the tank truck.

2. The system according to claim 1, wherein the transmitter and the receiver are each designed as measuring transducers for delivery, receipt, and conformity testing of identification codes.

3. The system according to claim 1, wherein the transmitter, when connected to the plug-in connector and upon receipt of a ready signal from each threshold sensor transmits selective switching-on signals to the receivers on the tank truck for selectively releasing the opening of individual valves in the compartments of the tank truck.

* * * * *